(12) United States Patent
Mattsson et al.

(10) Patent No.: US 6,758,502 B2
(45) Date of Patent: Jul. 6, 2004

(54) COUPLING RING FOR VENTILATION DUCTS, AND METHOD OF CONNECTING VENTILATION DUCTS

(75) Inventors: Lars-Åke Mattsson, Båstad (SE); Kenneth Lennartsson, Torekov (SE); Sten Högman, Grevie (SE); Carl-Gustaf Sondén, Ängelholm (SE)

(73) Assignee: Lindab AB, Bastad (SE)

( * ) Notice: Subject to any disclaimer, the term of this patent is extended or adjusted under 35 U.S.C. 154(b) by 0 days.

(21) Appl. No.: 09/764,643

(22) Filed: Jan. 17, 2001

(65) Prior Publication Data

US 2003/0160452 A1 Aug. 28, 2003

(51) Int. Cl.⁷ ............................. F16L 25/00; F16L 23/00
(52) U.S. Cl. ....................... 285/424; 285/363; 285/364; 285/405
(58) Field of Search ................................. 285/363, 364, 285/405, 424

(56) References Cited

U.S. PATENT DOCUMENTS

| | | | |
|---|---|---|---|
| 3,059,947 A | | 10/1962 | Felburg et al. |
| 3,630,549 A | * | 12/1971 | Grimm ........................ 285/424 |
| 4,133,566 A | * | 1/1979 | Miller ........................ 285/350 |
| 4,516,797 A | | 5/1985 | Meinig |
| 4,537,430 A | * | 8/1985 | Sullivan ..................... 285/424 |
| 4,765,375 A | * | 8/1988 | Nakajima .................... 138/155 |
| 4,836,585 A | | 6/1989 | Schauer |
| 4,995,648 A | * | 2/1991 | Jackson ....................... 285/424 |
| 5,104,159 A | * | 4/1992 | Sugiyama et al. ............ 285/424 |
| 5,129,690 A | * | 7/1992 | Meinig et al. ............... 285/424 |
| 5,135,270 A | * | 8/1992 | Arnoldt et al. .............. 285/424 |
| 5,794,322 A | * | 8/1998 | Issagholian-Havai ....... 285/424 |
| 5,983,496 A | | 11/1999 | Hermanson |
| 6,109,665 A | | 8/2000 | Meinig |
| 6,289,706 B1 | | 9/2001 | Hermanson |
| 6,301,781 B1 | | 10/2001 | Hermanson |

FOREIGN PATENT DOCUMENTS

| | | |
|---|---|---|
| CA | 2117216 | 9/1994 |
| CH | 521546 A | 5/1972 |
| DE | 1 650 169 | 9/1970 |
| DE | 43 08 013 A1 | 9/1994 |
| EP | 0 078 946 A1 | 5/1983 |
| GB | 1 407 796 | 9/1975 |
| GB | 2 311 031 B | 6/1998 |
| SE | 312 254 | 7/1969 |
| WO | 87/07700 | 12/1987 |
| WO | WO 93/17268 | 9/1993 |
| WO | WO 98/43010 | 10/1998 |

OTHER PUBLICATIONS

*AccuFlange: Round& Oval Duct Connection System*, Accu Duct Mfg., product brochure, 1998, pp. 1–32.
*LindabRekt*, Instruction manual, Lindab Nord AB, May 20, 1998, pp. 1–4.
*Rektangulara kanalsystem*, Lindab Rekt, product brochure 2000, pp. 1–8.
*Introduction to the Rectangular Duct Construction Schedules*, HVAC Duct Construction Standards Metal and Flexible—2$^{nd}$ ed., SMAGNA Section 1.8 ff., pp. 1.12–1.43.

* cited by examiner

Primary Examiner—James M. Hewitt
(74) Attorney, Agent, or Firm—Weingarten, Schurgin, Gagnebin & Lebovici LLP

(57) ABSTRACT

A flanged coupling ring for a duct element has a mounting section configured to be mounted or a connection portion of the duct element, and flange means extending outwards from the mounting section. The flange means has, along its periphery, flanged coupling portions for connecting two duct elements, each of which is provided with a coupling ring, by means of external coupling means configured to engage with the flanged coupling portions.

15 Claims, 8 Drawing Sheets

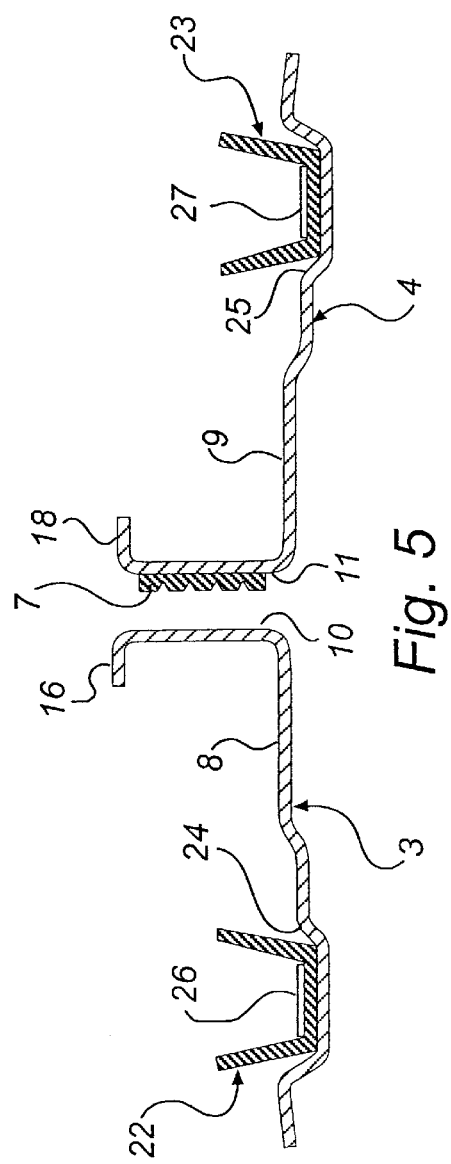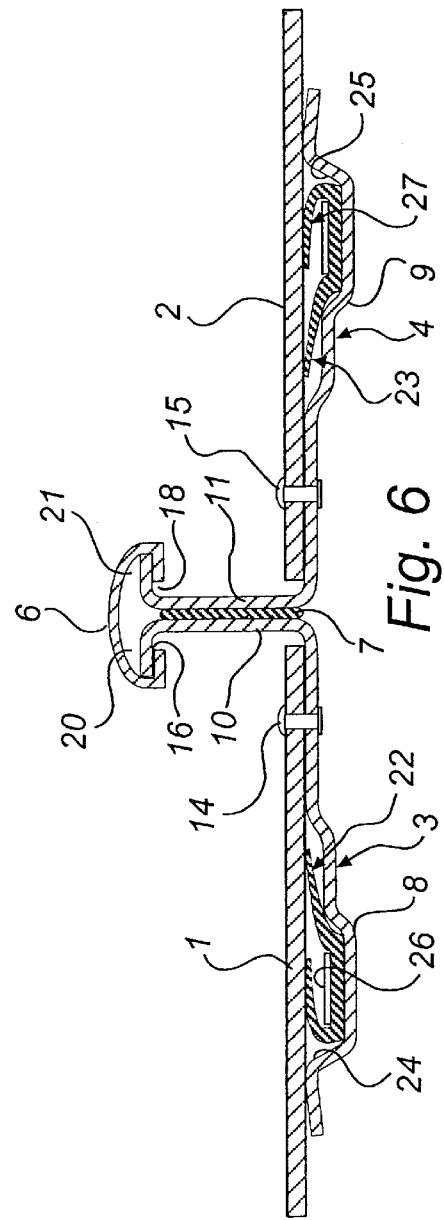

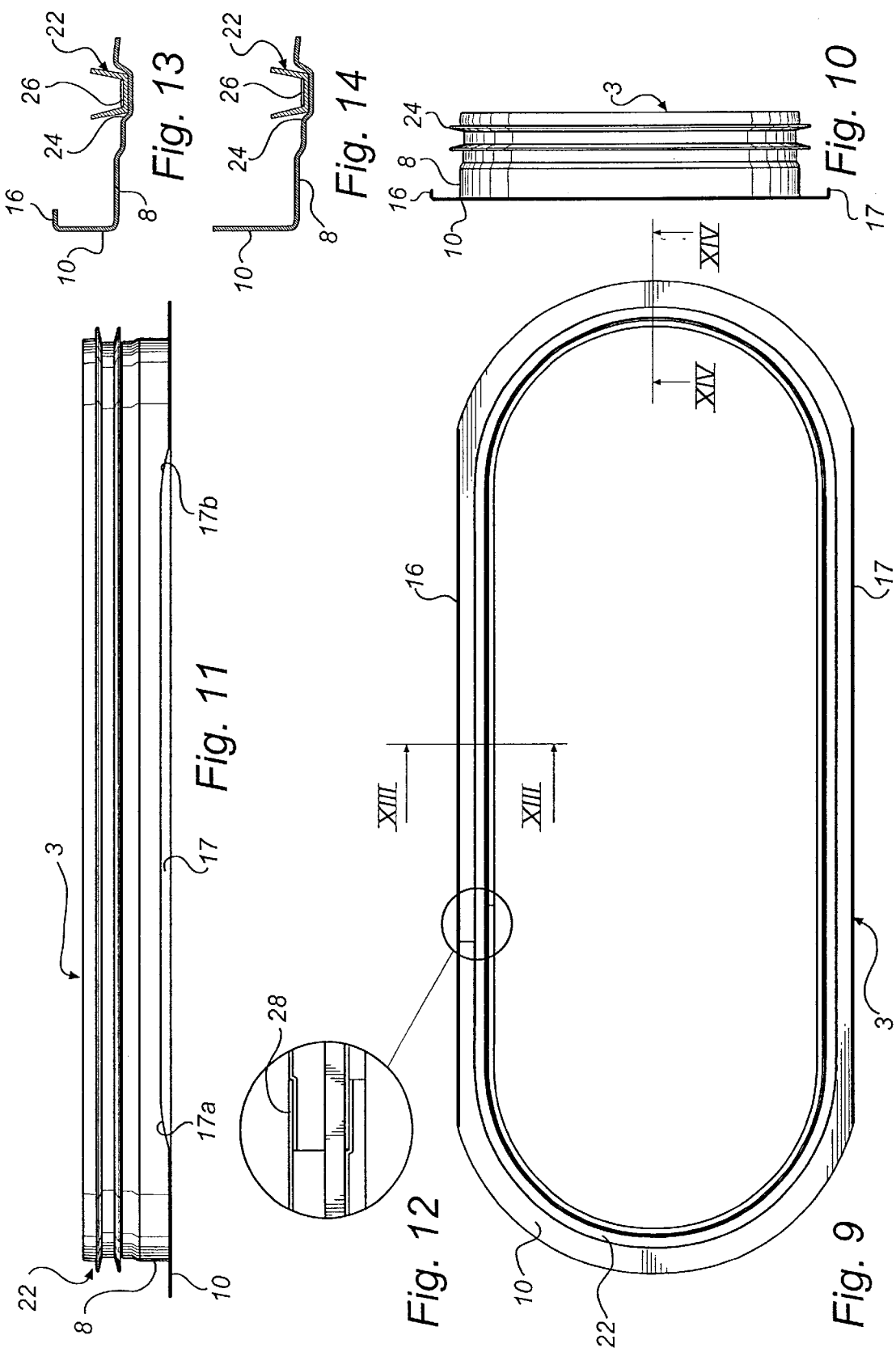

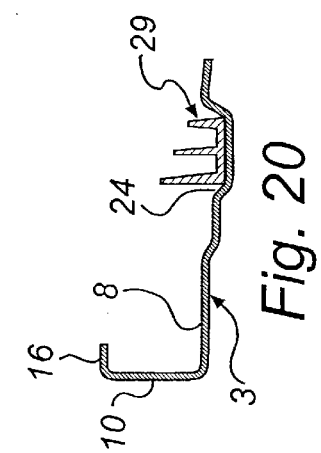
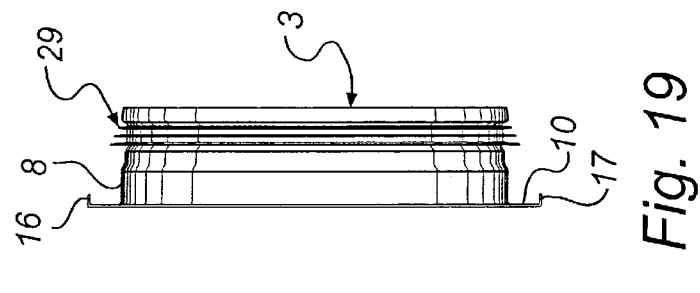
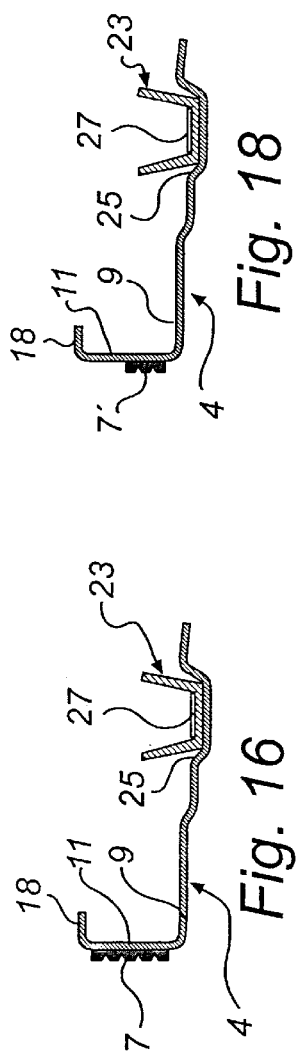
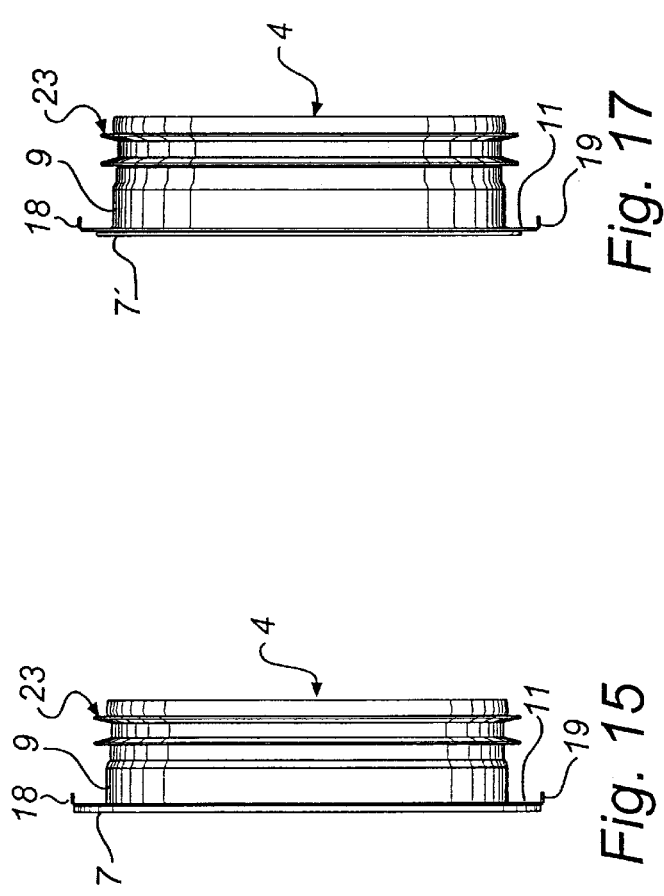

COUPLING RING FOR VENTILATION DUCTS, AND METHOD OF CONNECTING VENTILATION DUCTS

TECHNICAL FIELD

The present invention relates to a connection ring as well as an arrangement and a method for use in connecting duct elements. The invention concerns in particular, but not exclusively, connection of ventilation duct elements having an oval cross-section.

BACKGROUND ART

A known system of connecting ventilation duct elements is disclosed in a pamphlet entitled "Round & Oval Duct Connection System" and issued in 1998 by the US company Accu Flange Mfg. On the first two pages of this pamphlet, it is shown how the AccuFlange system works, for both round and oval ventilation ducts.

First, each of the two ducts to be connected is provided with a flanged coupling ring at its open end. Normally, sealing means is provided in order to secure tight joints between the coupling ring and the duct. Often, a sealing mastic is applied on the inside of the duct. Second, the two ducts are aligned end-to-end and the flanges of the coupling rings are abutted and connected to each other by means of fastening screws driven through the flanges. This fastening is shown in detail in a figure under the subtitle "Technical Data" in the AccuFlange pamphlet, and the duct connection is schematically shown in the section "Submittal Summary".

The AccuFlange system has, however, certain drawbacks. When mounting ducts in situ and along the ceiling, at the junction with the wall, the aim is that the ducts should be located as close to the ceiling and the wall as possible. Thus, when mounting AccuFlange ducts in situ at such locations, it is hard for the assembly personnel to find room for driving the fastening screws into the abutting flanges. Due to this cumbersome fastening operation, it is quite common that too few screws are driven through the portions of the flange that are facing the ceiling and the wall. This inadequate connection of the ducts may lead to air leakage in the joint between them.

A further disadvantage of the AccuFlange system is that the coupling ring flange is weakened in the areas where the fastening screws are driven through the material.

In general terms, the AccuFlange ducts are complicated to handle due to several operations when connecting the flanged coupling rings to the open ends of the ducts and also due to the specific difficulties when mounting the ducts near the ceiling.

U.S. Pat. No. 5,983,496 to Hermanson (corresponding to British Patent No. 2,311,031) discloses how an AccuFlange coupling ring is manufactured and used. As shown in FIGS. 5 and 5A, the coupling ring is built up of four separate parts, namely two straight parts and two semi-circular parts. The ends of the straight parts are connected to the ends of the semi-circular parts by welding (col. 10, lines 33–36). The flange of the coupling ring shown in FIGS. 1–4 is formed by a special operation called spin forming which is fairly hard to handle in practice. In FIG. 4, the above-mentioned fastening by means of screws is shown.

It is nowadays felt that there is a need for a duct connecting system which is simpler to mount and which has coupling rings that are simpler to handle and manufacture.

As to known arrangements for connecting duct elements, mention should also be made of Applicant's system called "LindabRekt". In written instructions for assembling of LindabRekt, distributed in 1998, it is shown how duct elements having a rectangular cross-section are connected by means of a special frame structure that is mounted on the open end of the duct. This frame structure comprises four separate parts LS1 that are fitted on the four end rim portions of a rectangular duct. The ducts are aligned end-to-end with the respective frame structures abutting each other, and special rails LS3 are fitted on the frame parts LS1 for connecting the two ducts together.

The LindabRekt frame structure LS3 is, however, not to be compared with a coupling ring of the type discussed above, since it consists of several separate parts which are separately fitted on the end rim of the ducts.

As to prior art, still another reference may be mentioned, namely a document entitled "HVAC Duct Contruction Standards Metal and Flexible", second edition, issued by SMACNA (the first edition of which is cited in Hermanson's U.S. Pat. No. 5,983,496). In sections 1.8 and 1.9 of this SMACNA document, various joint reinforcement and sealing techniques are discussed in relation to rectangular ducts. However, no duct coupling concept by which the above drawbacks of prior art are eliminated, is presented in the SMACNA reference.

SUMMARY OF THE INVENTION

The main object of the present invention is to eliminate, at least partially, the disadvantages of prior art systems and to provide an improved concept for coupling duct elements of this kind.

A particular object of the invention is to provide a new coupling ring which is easy to manufacture and easy to mount on the duct.

Still another object of the invention is to provide an improved technique for connecting duct elements by means of a new connecting arrangement and a new connecting method.

These and further objects which will appear from the specification to follow, have now been achieved by a flanged coupling ring for a duct element having a connection portion, the coupling ring comprising:

a mounting section having a periphery and being configured to be mounted on the connection portion of the duct element; and flange means having a periphery and extending outwards from the periphery of the mounting section;

the flange means comprising, along its periphery, flanged coupling portions for connecting two duct elements together, each of which is provided with a coupling ring, by means of external coupling means configured to engage with the flanged coupling portions.

The objects are also achieved by an arrangement for connecting a first duct element to a second duct element, each of the duct elements having a connection portion, the arrangement comprising:

a first flanged coupling ring with a mounting section having a periphery and being configured to be mounted on the connection portion of the first duct element;

a second flanged coupling ring with a mounting section having a periphery and being configured to be mounted on the connection portion of the second duct element;

each of the coupling rings comprising flange means having a periphery and extending outwards from the periphery of the mounting section, the flange means of the coupling rings comprising, along a periphery thereof, flanged coupling portions for connecting the duct elements; and external coupling means configured to engage with the flanged coupling portions of the flange means of the coupling rings, when the flanged coupling portions are abutted, in order to provide the connection of the duct elements.

Furthermore, the objects are achieved by a method of connecting a first duct element to a second duct element, each of the duct elements having a connection portion provided with a flanged coupling ring with outwardly projecting flange means, the method comprising the steps of:

aligning the connection portions of the two duct elements so that the coupling rings are opposite each other;

abutting the coupling rings so that flanged coupling portions along the periphery of the flange means of the coupling rings are in abutment with each other, thereby forming joint portions; and bringing external coupling means into mutual engagement with the abutting flanged coupling portions so that the duct elements are connected to each other at the joint portions.

The objects are also achieved by a method, in which the flanged coupling rings are pre-mounted on the duct elements and the duct elements are aligned and abutted as defined above, followed by the step of bringing external coupling means into mutual engagement with the abutting flanged coupling portions.

Thus, the flange means of each coupling ring comprises, along its periphery, flanged coupling portions for connecting two coupling rings together by means of external coupling means, preferably elongate strips or rails, configured to engage with the flanged coupling portions, whereby two duct elements, each provided with coupling rings, are connected. This is a very favorable structure, as will be discussed further below.

The inventive duct coupling concept has several advantages over prior art. The coupling ring is easy to manufacture, for instance by roll forming operations, and it is also easy to mount the same to the duct element. Preferably, the coupling ring is formed in one piece which emphasizes the simplicity by which it is manufactured. If the flanged coupling portions of the coupling ring are formed as substantially straight portions along the periphery of the flange means, it is easy to fit the external coupling means on the flanged portions.

Most preferably, the external coupling means are elongate strips which are slid onto the straight flanged coupling portions, in a direction which follows the periphery of the flange means. With this structure, no fastening screws have to be driven through the flange means at locations which are difficult to reach, for instance near the ceiling and the wall.

In a preferred embodiment, the flanged coupling portions of the coupling ring are spaced with respect to the periphery of the flange means, and most preferably at least two of the flanged coupling portions are opposite each other with respect to a center axis of the mounting section of the coupling ring. This structure is particularly suitable for oval duct elements, since secure flange connection is provided on each straight portion of the oval joint. Thus, a tight connection is achieved.

In still another preferred embodiment, the mounting section of the coupling ring is an insertion section configured to be inserted in the connection portion of the duct element. It is preferred that the insertion section is provided with an external, circumferential sealing element. As a result, a simple and reliable sealing effect is achieved at the joint between the outside surface of the coupling ring and the inside surface of the duct element. No sealing mastic, as is used in connection with the known AccuFlange system, is needed.

The coupling arrangement or kit itself and the associated method also have many advantages. Two flanged coupling rings, which in the preferred embodiment are similar and formed as unitary pieces, are easily mounted on the connection portions of the duct elements. With the flanged coupling portions of the two duct elements abutting each other, an external coupling means of simple structure is engaged with the flanged coupling portions, and the duct connection is established. In particular when the external coupling means, according to a preferred embodiment, are slidable on the flanged coupling portions, it is very easy to provide the duct connection. Practical tests of a coupling arrangement of this embodiment have shown extremely good results. The time for assemblying two ducts in accordance with the invention is about half of the time required by prior-art arrangements.

It should be mentioned that the invention does not only concern connection of ventilation duct elements, but also connection of other fluid-conducting duct elements, such as ducts for transportation of grain, dust and the like by means of an air flow. Further, it is pointed out that the invention is not restricted to duct elements having a particular cross-section, but the inventive concept is applicable to various cross-sections, including oval, circular, polygonal, etc. Indeed, the invention is particularly advantageous when applied to ducts having an oval cross-section, or a so-called flat-oval cross-section. By this term is meant a cross-sectional shape comprising two straight, parallel, spaced portions and two spaced, semi-circular portions.

BRIEF DESCRIPTION OF THE DRAWINGS

The invention and its many advantages will now be further described, reference being made to the accompanying schematic drawings showing some presently preferred, exemplifying embodiments.

FIGS. 5 and 6 are sectional views at the joint between the two ventilation ducts.

FIG. 9 is a rear view of the coupling ring of FIGS. 7–8.

FIG. 10 is an end view of the coupling ring of FIG. 9.

FIG. 11 is a side view of the coupling ring of FIG. 9.

FIG. 12 is an enlarged detail of FIG. 9 illustrating a joint of the coupling ring.

FIGS. 13 and 14 are cross-sections taken along lines XIII—XIII and XIV—XIV, respectively, in FIG. 9.

FIG. 15 is an end view of one of the coupling rings of FIG. 1.

FIG. 16 is a cross-section of the coupling ring of FIG. 15.

FIGS. 17–18 and FIGS. 19–20, respectively, show alternative embodiments of the coupling ring, corresponding to FIGS. 15–16.

DETAILED DESCRIPTION OF PREFERRED EMBODIMENTS

Figure 1:
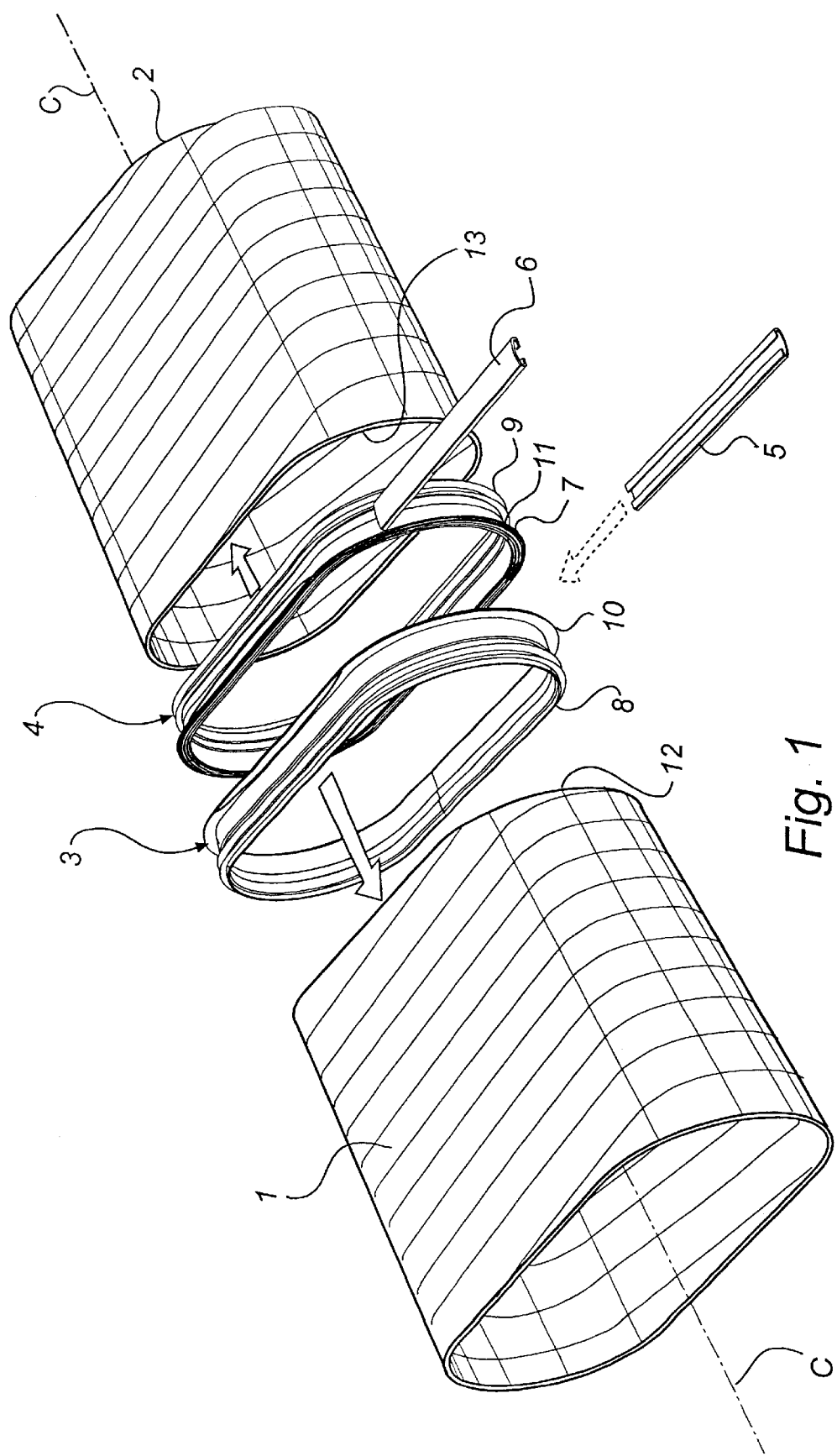
FIG. 1 illustrates in the perspective an arrangement and a method of the invention for connecting two ventilation ducts having an oval cross-section.
Figure 2:
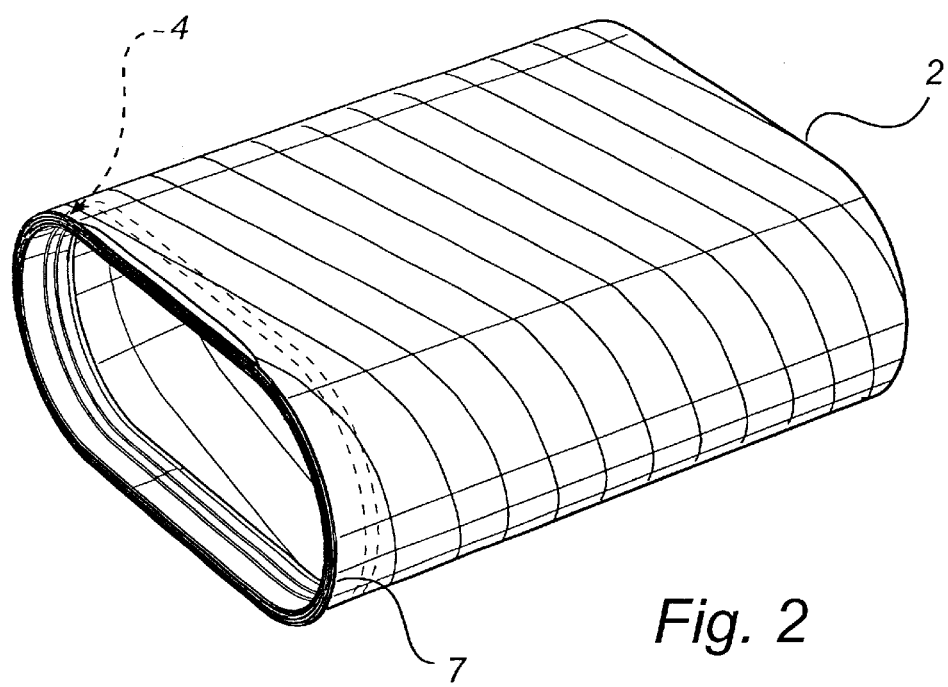
FIG. 2 shows in the perspective one of the ventilation ducts of FIG. 1 with a coupling ring inserted at the open end.
Figure 3:
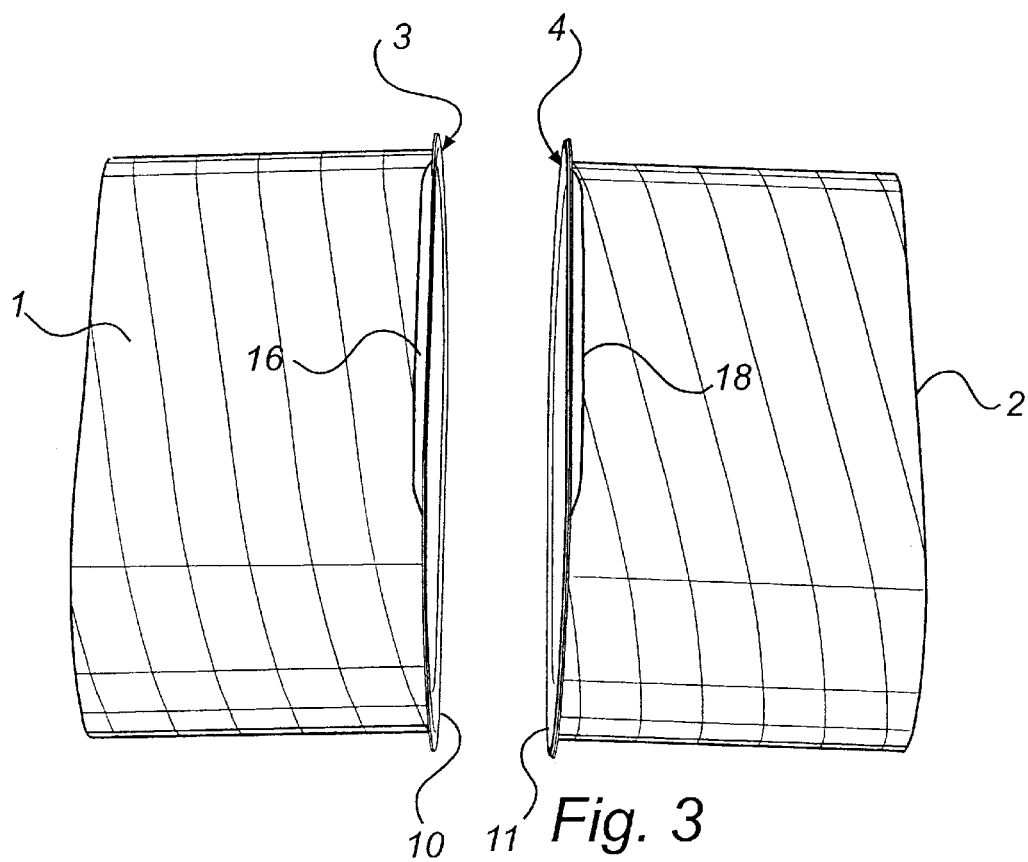
FIG. 3 shows how two ventilation ducts are aligned before connection.

FIGS. 1–4 show the basic idea behind the invention, namely how two duct elements 1 and 2 are connected to each other by means of an arrangement comprising two flanged coupling rings or frames 3 and 4, and external coupling means in the form of two elongate strips or rails 5 and 6, also referred to a cleats. In this example, the duct elements 1 and 2 are ventilation ducts with a flat-oval cross-section to be used in a ventilation system. In the preferred embodiment, the two coupling rings 3 and 4 are identical or at least very similar, as are the two coupling strips 5 and 6. One of the coupling rings 4 is provided with a front sealing element 7.

Both coupling rings 3 and 4 have a circumferential mounting or insertion section 8 and 9, respectively, and circumferential flanges 10 and 11 which project outwards from the periphery of the respective insertion section 8 and 9, preferably orthogonally. As shown, the insertion sections 8 and 9 of the coupling rings 3 and 4 are adapted to be inserted in matching connection portions of the ducts 1 and 2, that is in the open ends 12 and 13 thereof, until the flanges 10 and 11 come into abutment with the end rim of the ducts 1 and 2. The coupling rings 3 and 4 are fastened to the ducts 1 and 2 by suitable fastening means, for instance rivets 14 and 15, as shown in FIG. 6.

Figure 4:
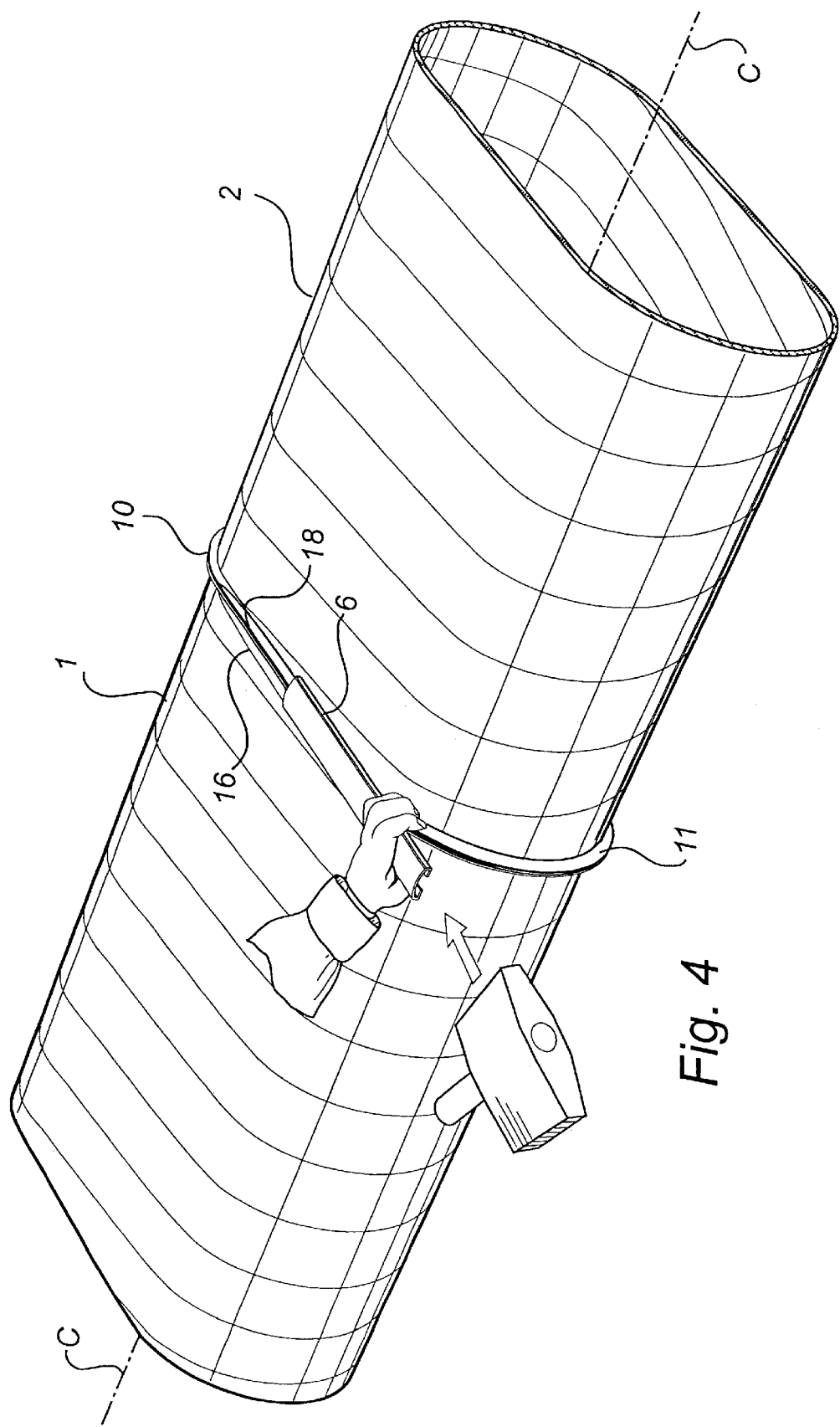
FIG. 4 illustrates in the perspective how two ventilation ducts are connected to each other in accordance with the invention.
Figure 7:
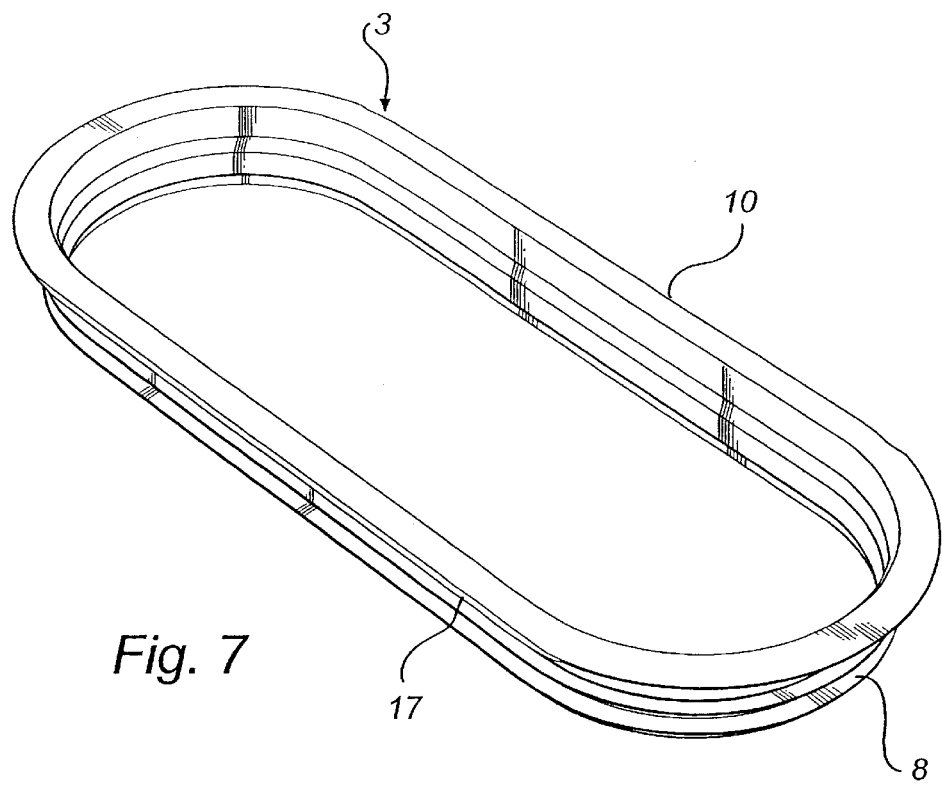
FIGS. 7 and 8 are two perspective views of an oval coupling ring in accordance with a basic embodiment of the invention.
Figure 8:
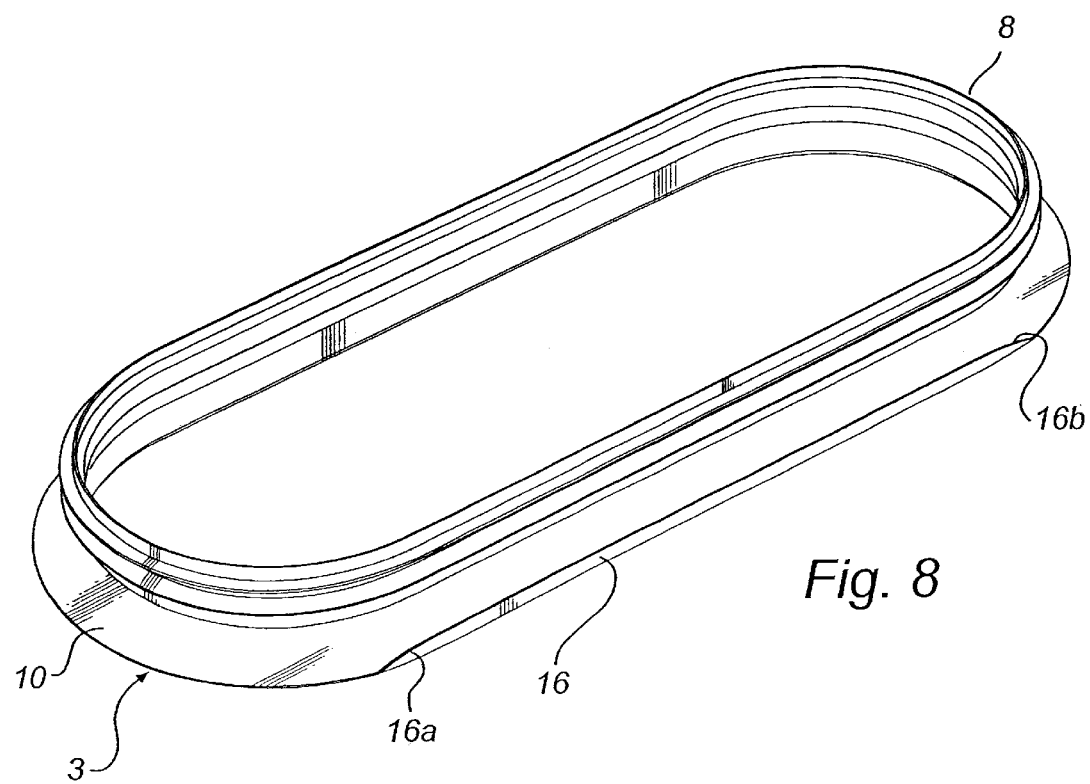

As is clear from FIGS. 1 and 4, the two duct elements 1, 2 and the two coupling rings 3, 4 are coaxial when in position for connection. Basically, these four components 1–4 have a common center axis schematically indicated with C in FIGS. 1 and 4.

Along the straight portions of its periphery, both coupling rings 3 and 4 have flanged coupling portions in the form of opposite, substantially straight rims 16, 17 and 18, 19, respective, see FIGS. 10 and 15. When connecting the aligned ducts 1 and 2, end-to-end, with the flanged coupling rings 3 and 4 abutting each other, the external coupling strips 5 and 6 are slid onto the upper coupling rims 16, 18 and the lower coupling rims 17, 19, respectively, as shown in FIGS. 1 and 4. The coupling strips 5 and 6 are slid onto the rims 16–19 along the periphery of the flanges 10 and 11, that is in a direction substantially transversely to the center axis C of the insertion sections 8 and 9 which are coaxial with the ducts 1 and 2.

FIGS. 5–6 illustrate how the flanges 10 and 11 of the coupling rings 3 and 4 are abutted, and how the upper coupling rims 16 and 18 are put together and connected by the upper coupling strip 6 providing mutual engagement with the rims 16 and 18. The strip or rail 6 is at least semi-rigid, preferably rigid in order to have the appropriate stiffness. Preferably, the strips 5, 6 are of metal, but other materials are feasible, for instance plastics.

As shown, the strip 6 has a C-shaped cross-section defining two grooves 20 and 21, respectively, adapted to engage with the respective rims 16 and 18. Expressed in other words, the slidable coupling strip 6 has two spaced, opposite hook portions adapted to engage with the rims 16 and 18 on either side of the joint between the abutting flanges 10 and 11. Preferably, the coupling strip 6 is somewhat resilient so that the sliding operation is easy at the same time as the coupling effect is guaranteed.

FIGS. 5–6 also show how the front sealing element 7 of one of the coupling rings 4 is compressed in the joint, thereby securing appropriate tightness and eliminating the risk of leakage at the joint. It is easily understood that this new manner of connecting two ducts 1 and 2 in very quick and that a reliable and tight joint is achieved.

Furthermore, FIGS. 5–6 show that each of the insertion sections 8 and 9 of the coupling rings 3 and 4 are provided with external sealing rings, here in the form of two-lip sealing rings 22 and 23, respectively, which are known per se and need not be described in detail. The sealing rings 22 and 23 are placed in circumferential grooves 24 and 25 and fastened by clamping straps 26 and 27, respectively. Owing to this sealing structure, a reliable tight sealing is achieved between the outer surface of the insertion sections 8, 9 and the inner surface of the ducts 1, 2. The grooves 24 and 25 have a spin-off effect in that they enhance the stiffness of the coupling rings 3 and 4, which in turn makes the insertion easier and results in a stiff and stable connection of the coupling ring in the connection portion of the duct.

In FIGS. 7–12, the flanged coupling ring 3 to the left in FIGS. 1 and 5–6 is shown separately. The coupling ring 3 is of a simple unitary structure, manufactured in one piece by roll forming operations. The flange 10 extends along the entire periphery of the coupling ring 3 and is bent along the straight portions to form the rims 16 and 17 which are perpendicular to the flange 10. This bending is a standard operation, not adding particular costs in manufacture. By this bending, the two end of the rims 16 and 17 are automatically beveled, shown at 16a, 16b and 17a, 17b, which makes it easy to slide the strips 5, 6 on the rims 16, 17.

When manufacturing the coupling ring 3, a straight elongate blank of sheet metal (not shown) is passed longitudinally through a roll forming machine, in which the groove 24 and the flange 10 are formed. The blank is then further rolled to the desired flat-oval shape by means of a special roller assembly (not shown), and the two ends of the blank are connected to each other in an overlapping junction 28, schematically shown in FIG. 12. Thus, the coupling ring 3 is formed in one piece and has only one junction without any welds, which are common on most prior art coupling rings, for instance AccuFlange. This coupling ring structure has great advantages in terms of low production costs and low risk of leakage.

FIGS. 15–16 show the coupling ring 4 to the right in FIGS. 1 and 5–6. The coupling ring 4 is identical to the coupling ring 3 described above with the exception that the flange 11 is provided with a front sealing element 7. In FIGS. 17–18 the coupling ring 4 is shown with a slightly modified front sealing element 7' which is narrower than the front sealing element 7 shown in FIGS. 15–16. Indeed, further alternatives are feasible when it comes to providing front sealing elements.

An additional embodiment is shown in FIGS. 19–20, namely a coupling ring 3 without a front sealing element but with an alternative rear sealing element on the insertion section 8, that is a three-lip sealing ring 29 which may be favorable in particular cases involving strict requirements for tightness. Normally, this three-lip sealing ring 29 is not tightened by means of clamping straps, but it is fastened by means of an adhesive (not shown).

Figure 21:
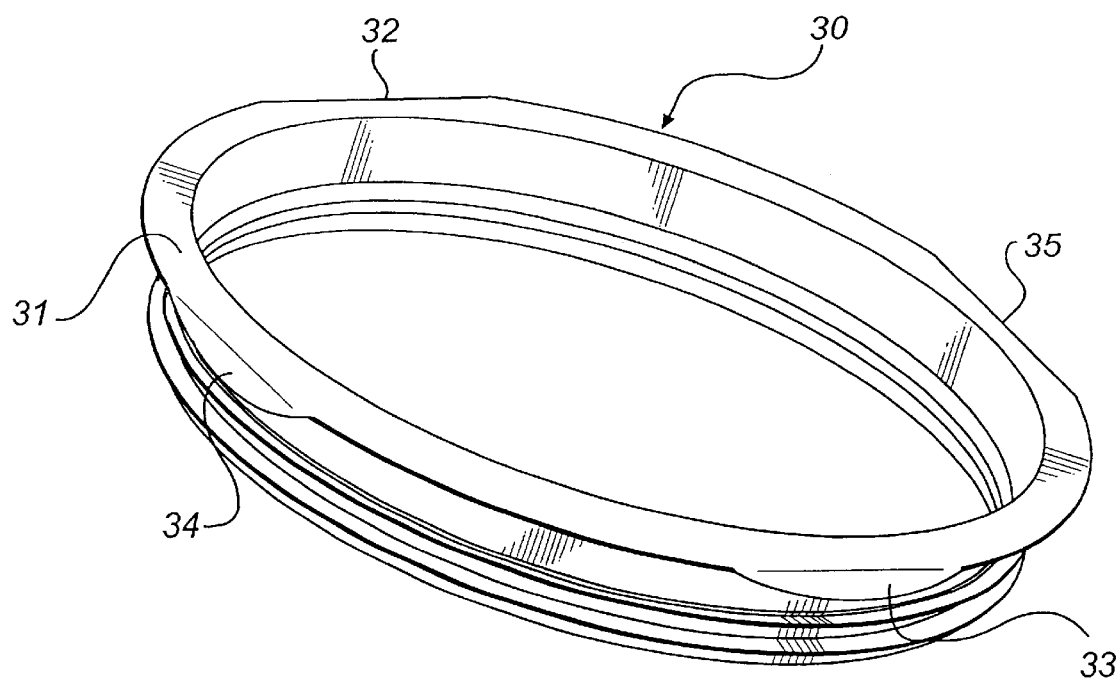
FIGS. 21 and 22 show in the perspective a circular coupling ring according to still another embodiment of the invention.
Figure 22:
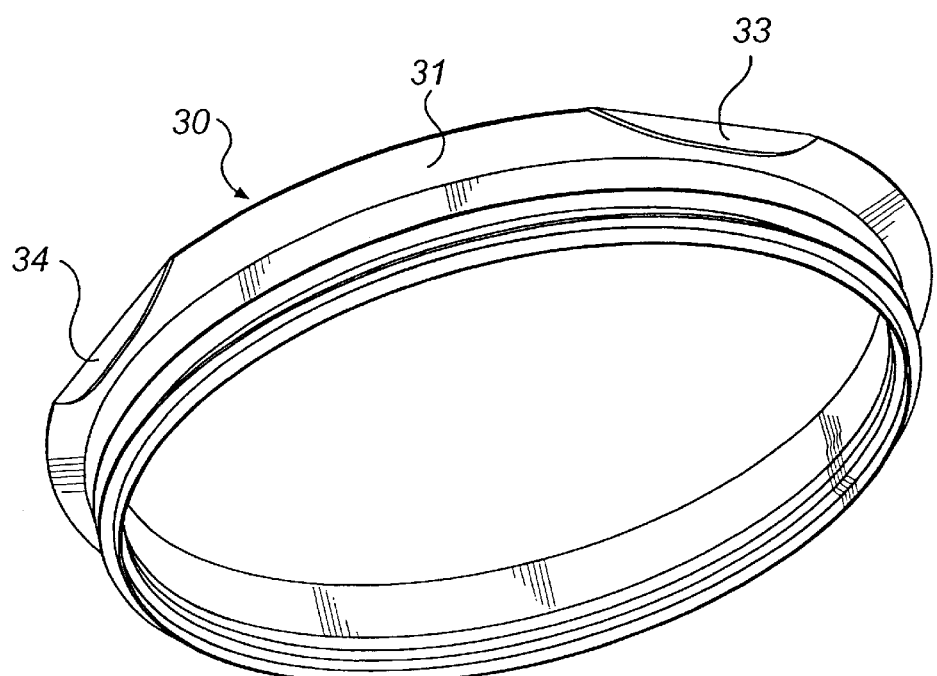

A circular embodiment of the inventive coupling ring 30 is shown in FIGS. 21–22. In line with the new coupling concept, the coupling ring 30 has a circumferential flange 31 with straight, spaced flange portions 32–35 along its periphery. In this case, fairly short coupling strips or rails of the type described, reference numerals 5 and 6, are brought into engagement with the flange portions 32–35 when connecting two circular coupling rings 30 of this kind in an end-to-end relationship, as discussed. The round coupling ring 30 can have rear and front sealing elements, as described in relation to the oval coupling rings.

The method according to the invention is evident from the description above. However, it should be mentioned that in practice the coupling rings can either be pre-mounted on the ducts before transportation to the premises where the duct system is to be installed, or mounted in situ just before the duct system is to be built. Furthermore, it is optional if the front and/or rear sealing elements are attached to the coupling rings in advance or in situ when the duct system is being built.

Finally, it should be emphasized that the inventive concept is by no means restricted to the embodiments described herein, and several modifications are feasible within the scope of the invention as defined in the appended claims. For instance, the cross-sections of the duct elements are not crucial, neither are the materials of which the main components are made. Preferably, however, the coupling rings are made of sheet metal, as are the coupling strips which can be rigid or semi-rigid. In certain circumstances, a single somewhat flexible external coupling means (strip) may be used which is fitted on a major portion of the periphery of the coupling flanges. The sealing elements are preferably made of an elastomeric material, for instance rubber.

In a variant (not shown), the coupling strips are not slid onto the coupling flanges but passed along these and snapped into engagement with the same by a turning operation.

It should also be pointed out that the inventive concept is applicable to many kinds of products, for instance various ventilation duct components, such as fittings included in a ventilation duct system. Thus, the invention is not restricted to connection of elongate duct elements, such as ventilation tubes or pipes. It is not necessary for the coupling ring to be partially inserted in a duct element, but it can be mounted directly on the connection portion of the same by a suitable method.

What we claim and desire to secure by Letters Patent is:

1. A flanged coupling ring for a duct element having a connection portion, for connecting the duct element with both an associated flanged coupling ring for a second duct element and an external coupling means, said coupling ring comprising two opposite, straight, parallel portions and two opposite semi-circular portions, thereby forming an oval coupling ring, said oval coupling ring further comprising:
   a mounting section having a periphery and a shape essentially the same as the shape of the duct element, said mounting section being configured to be mounted on said connection portion of said duct element; and
   flange means having a periphery and extending outwards from said periphery of said mounting section;
   said flange means comprising flanged coupling portions disposed along the periphery and configured to mate with the external coupling means, at least two of said coupling portions opposite each other with respect to a center axis of said mounting section, said at least two flanged coupling portions disposed along said parallel portions of said oval coupling ring, whereby the two duct elements are connectable when the associated flanged coupling ring, which has associated flanged coupling portions, is mounted on the second duct element with the external coupling means spanning outermost straight portions of adjacent sections of said flanged coupling portions and associated flanged coupling portions.

2. The coupling ring of claim 1, wherein said flanged coupling portions are spaced with respect to said periphery of said mounting section.

3. The coupling ring of claim 1, wherein said flange means extends substantially orthogonally from said periphery of said mounting section.

4. The coupling ring of claim 1, wherein said flanged coupling portions comprise a rim which is substantially perpendicular to said flange means and which is spaced from and extending outwardly of said mounting section.

5. The coupling ring of claim 4, wherein each said rim extends over substantially the entire length of said flanged coupling portion associated therewith.

6. The coupling ring of claim 1, wherein said flange means extends along the entire periphery of said mounting section.

7. The coupling ring of claim 1, wherein said mounting section is an insertion section configured to be inserted in said connection portion of said duct element.

8. The coupling ring of claim 7, wherein said flange means is provided with a front sealing element.

9. The coupling ring of claim 1, wherein said flange means is provided with a front sealing element.

10. A duct element, in particular a ventilation duct, provided with a flanged coupling ring as claimed in claim 1.

11. A kit for joining duct elements, comprising one or more coupling rings of claim 1 and one or more elongated strips configured to be slid onto flanged coupling portions of said coupling rings.

12. A method of connecting a first duct element to a second duct element, each of said duct elements having a connection portion, each of said duct elements having an oval shape with two opposite, straight, parallel portions and two opposite semi-circular portions, said method comprising the steps of:
   mounting a first flanged coupling ring having an oval shape essentially the same as the oval shape of said first duct element on said connection portion of said first duct element, said first coupling ring comprising outwardly projecting flange means having a periphery;
   mounting a second flanged coupling ring having an oval shape essentially the same as the oval shape of said second duct element on said connection portion of said second duct element, said second coupling ring comprising outwardly projecting flange means having a periphery;
   aligning said connection portions of said two duct elements so that said coupling rings are opposite each other;
   abutting said connection portions of said two duct elements so that said coupling rings are opposite each other;
   abutting said coupling rings so that flanged coupling portions along said periphery of said flange means of said coupling rings are in abutment with each other, thereby forming joint portions; and
   bringing external coupling means into mutual engagement with said abutting flanged coupling portions by spanning outermost straight sections of said flanged coupling portions, so that said duct elements are connected to each other at said joint portions.

13. A coupling ring for coupling a first duct element to a second duct element, the duct elements comprising tubular elements having a substantially similar oval cross section with two straight sections and two curved sections, the two straight sections spaced between and interconnecting the two curved sections, the coupling ring configured for cooperation with a substantially similar coupling ring provided for the second of the two duct elements and operative in association with an external coupling means configured to span portions of the coupling ring and the substantially similar coupling ring, the coupling ring comprising:

a strip formed to provide a mounting section, the mounting section configured to fit inside an open end of the first duct element, the mounting section having an oval shape configured to conform to the oval cross section of the first duct element, the mounting section having an outer periphery;

the strip further formed to provide a flange extending entirely along the outer periphery of the mounting section in a radially outward direction with respect to a longitudinal axis defined by the first duct element, the flange having an oval cross-section with two straight flange portions and two curved flange portions, the two straight flange portions spaced between and interconnecting the two curved flange portions; and the strip further formed to provide two rims extending from the two straight flange portions of the flange, the rims extending generally parallel to the longitudinal axis of the duct element and in a direction to extend over the mounting section whereby the external coupling means is slidable over and along the rims.

14. A flanged coupling ring for an oval duct element having a connection portion, for connecting the oval duct element with both an associated flanged coupling ring for a second oval duct element and an external coupling means, said coupling ring comprising:

a mounting section having a periphery and a shape essentially the same as the shape of the oval duct element, said mounting section being configured to be mounted on said connection portion of said oval duct element; and flange means having a periphery and extending outwards from said periphery of said mounting section, said flange means comprising two straight flange portions and two curved flange portions;

said flange means comprising flanged coupling portions disposed along the two straight flange portions and configured to mate with the external coupling means, whereby the two oval duct elements are connectable when the associated flanged coupling ring, which has associated flanged coupling portions, is mounted on the second oval duct element with the external coupling means spanning outermost straight portions of adjacent sections of said flanged coupling portions and associated flanged coupling portions.

15. A flanged coupling ring for a duct element having a connection portion, for connecting the duct element with both an associated flanged coupling ring for a second duct element and an external coupling means, said coupling ring comprising two opposite straight, parallel portions and two opposite semi-circular portions, thereby forming an oval shape, said coupling ring further comprising:

a mounting section having a periphery and a shape essentially the same as the shape of the duct element, said mounting section being configured to be mounted on said connection portion of said duct element; and flange means having a periphery and extending outwards from said periphery of said mounting section;

said flange means comprising flanged coupling portions disposed along the periphery and configured to mate with the external coupling means, the flanged coupling portions disposed opposite each other with respect to a center axis of said mounting section and providing said straight, parallel portions of said oval shape, whereby the two duct elements are connectable when the associated flanged coupling ring, which has associated straight, parallel flanged coupling portions, is mounted on the second duct element with the external coupling means spanning said straight parallel portions of adjacent sections of said flanged coupling portions and associated flanged coupling portions.

* * * * *

UNITED STATES PATENT AND TRADEMARK OFFICE
CERTIFICATE OF CORRECTION

PATENT NO. : 6,758,502 B2
APPLICATION NO. : 09/764643
DATED : July 6, 2004
INVENTOR(S) : Lars-Åke Mattsson et al.

It is certified that error appears in the above-identified patent and that said Letters Patent is hereby corrected as shown below:

Title page, Abstract item (57), line 2, "or" should read --on--;

Column 5, line 41, "respective" should read --respectively--;

Column 7, line 63, claim 1, "ring, whereby" should read --ring, said flanged coupling portions comprising straight portions of the flange means bent to form a rim, the rim having two beveled ends each forming a transition to one of the semi-circular portions of the flange means, --;

Column 8, lines 11-12, claim 4, "wherein said flanged coupling portions comprise a rim which" should read --wherein each said rim--;

Column 8, line 13, claim 4, delete "which";

Column 8, lines 31-32, claim 11, "one or more elongated strips" should read --said external coupling means--;

Column 8, line 32, claim 11, "onto flanged" should read --onto said flanged--;

Column 8, line 44, claim 12, "periphery;" should read --periphery, the flange means comprising flanged coupling portions, the flanged coupling portions comprising straight portions of the flange means bent to form a rim, the rim having two beveled ends each forming a transition to one of the semi-circular portions of the flange means;--;

Column 8, line 50, claim 12, "periphery;" should read --periphery, the flange means comprising flanged coupling portions, the flanged coupling portions comprising straight portions of the flange means bent to form a rim, the rim having two beveled ends each forming a transition to one of the semi-circular portions of the flange means;--;

Column 8, line 57, claim 12, "that flanged" should read --that the flanged--;

Column 8, line 63, claim 12, "outermost straight sections" should read --the rims--;

Column 10, line 4, claim 14, "disposed along" should read --comprising--;

Column 10, line 4, claim 14, "portions and" should read --portions bent to form a rim, the rim having beveled ends each forming a transition to one of the curved flange portions, and--;

UNITED STATES PATENT AND TRADEMARK OFFICE
CERTIFICATE OF CORRECTION

PATENT NO. : 6,758,502 B2
APPLICATION NO. : 09/764643
DATED : July 6, 2004
INVENTOR(S) : Lars-Åke Mattsson et al.

It is certified that error appears in the above-identified patent and that said Letters Patent is hereby corrected as shown below:

Column 10, line 32, claim 15, "section and providing" should read --section, said flanged coupling portions comprising--; and Column 10, line 33, claim 15, "shape, whereby" should read --shape bent to form a rim, the rim having beveled ends each forming a transition to a semi-circular portion of the flange means, whereby--.

Signed and Sealed this

Twentieth Day of March, 2007

JON W. DUDAS
*Director of the United States Patent and Trademark Office*